April 13, 1937.  J. N. WILLIAMS  2,076,689
MELTING KETTLE
Filed Jan. 6, 1936
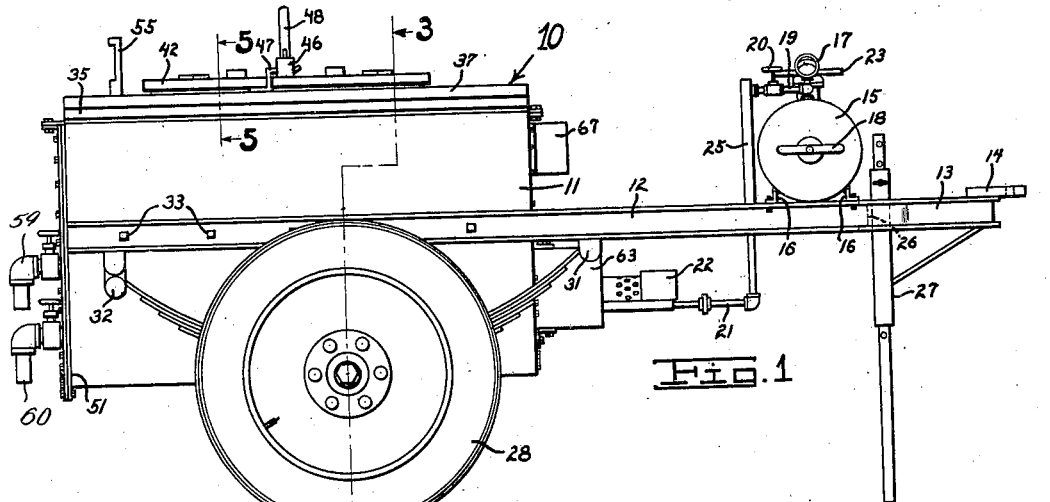
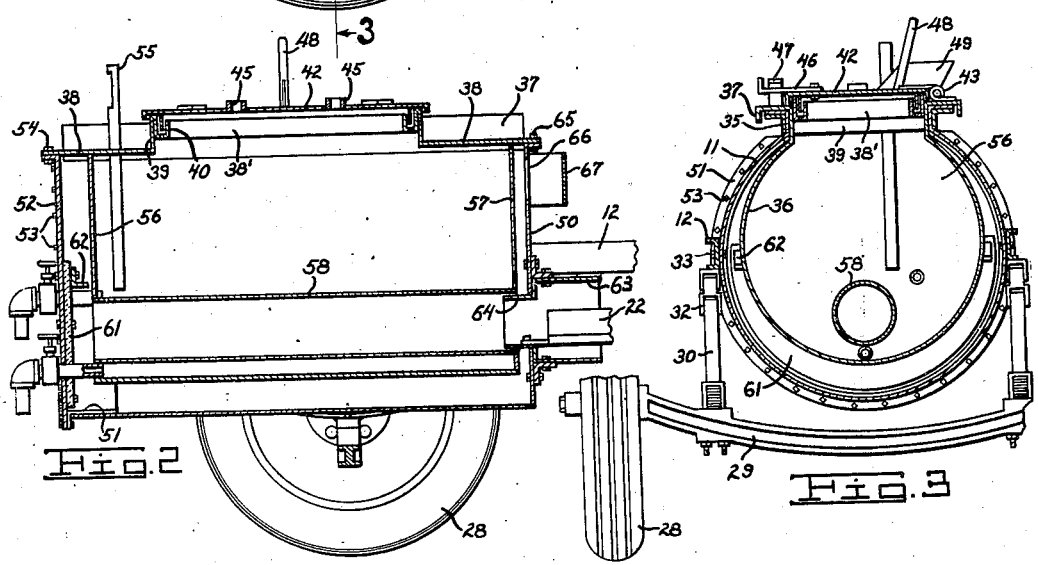
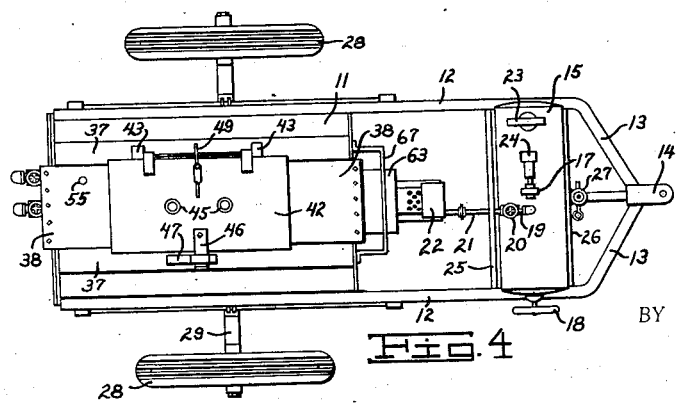
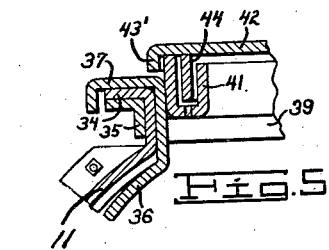
INVENTOR.
JAMES N. WILLIAMS
BY
ATTORNEY.

Patented Apr. 13, 1937

2,076,689

UNITED STATES PATENT OFFICE 2,076,689

MELTING KETTLE

James N. Williams, Pasadena, Calif.

Application January 6, 1936, Serial No. 57,709

4 Claims. (Cl. 126—343.5)

This invention relates to melting kettles.

The general object of the invention is to provide an improved melting kettle which is particularly adapted for melting bituminous materials for use on roofs, for paving, etc.

A more specific object of the invention is to provide a melting kettle which can be economically manufactured and wherein the parts are not apt to warp or to become distorted due to heat, and wherein repairs can be economically made.

An additional object of the invention is to provide a melting kettle including an outer container and an inner receptacle so arranged that there is a crescent shaped space between the two so that good heat control is secured.

Another object of the invention is to provide a melting kettle including a flange closure portion which extends above the body of the kettle so that the kettle may be filled above the heating line to prevent flashing.

Another object of the invention is to provide an improved flue construction and vent for a melting kettle.

Other objects and the advantages of the invention will be apparent from the following description taken in connection with the accompanying drawing, wherein:

Fig. 1 is a side elevation showing my improved melting kettle;

Fig. 2 is a fragmentary, central, vertical section through a kettle embodying the features of my invention;

Fig. 3 is a fragmentary section taken on line 3—3 of Fig. 1;

Fig. 4 is a top plan view showing my melting kettle; and

Fig. 5 is an enlarged fragmentary section through the upper portion of the container and kettle.

Referring to the drawing by reference characters I have shown my invention as embodied in a melting kettle indicated generally at 10.

As shown the kettle comprises an outer container 11 which is circular in cross-section and which has a frame 12 secured to each side thereof. The frame extends forwardly from the kettle and includes front portions 13 on which a coupling member 14 is mounted so that the kettle may be attached to a truck or other vehicle.

Transversely of the frame I arrange a fuel tank 15 which is supported on angle members 16 and the fuel tank as shown includes a pressure gage 17 and a pump 18. The fuel tank communicates through a pipe 19, which is controlled by a valve 20, with a pipe 21 the latter of which is adapted to discharge fuel into a burner 22 which may be of any desired construction suitable for the purpose intended.

The tank 15 further includes a filler cap 23 and a relief valve 24.

To shield the tank 15 and its accessories from the heat of the burner 22 I provide a shield 25 extending between and above the members 12.

A cross member 26 extends between the members 12 and supports an adjustable leg 27 which is adapted to hold the kettle in a horizontal position when it is disconnected from a vehicle.

In order to transport the kettle I provide a pair of wheels 28, which are secured to an axle 29 which supports springs 30. The springs 30 are secured to the members 12 by suitable shackles 31 and 32.

The outer container 11 is secured to the frame members 12 by bolts 33. The upper edges of the container 11 are formed into angular shelves 34 which are reinforced by angle members 35. The shelves 34 extend the entire length of the container 11 and are adapted to support an inner tank member 36 which is cylindrical in shape and which includes adjacent the upper edges thereof angular hanger portions 37 which are coextensive with and slidably engage the shelf portions 34.

Extending between the hanger portions 37 at both ends thereof I provide aprons 38. The inner ends of the aprons 38 are bent upwardly to form flanges which surround a filling aperture 38'. The flanges form a cover engaging portion 39 and then bend downward to form a U-shaped sealing portion 40.

Extending along the hangers 37 between the portions 39 I provide U-shaped sealing portions 41 similar to the portions 39 and 40. (See Fig. 5.)

A cover member 42 is secured to one of the hangers 37 by suitable hinges 43. The periphery of the cover 42 is provided with a downwardly extending flange 43' which is positioned outside the portions 39 and 41 when the lid is closed. A second flange 44 is secured to the cover 42 a short distance inside the flange 43. The flange 44 is adapted, when the cover is closed, to extend into the U-shaped members 40 and 41. (See Fig. 5.)

The cover is provided with suitable vents 45. A closure latch arm 46 is pivotally mounted on the cover 42 and is adapted to engage a latch member 47 secured to the hanger 37. A rigid handle 48 is secured to the cover 42 on the same side thereof as the hinge 43 so that a person opening the cover will stand on the side where he will be shielded by the cover as the latter is raised. The handle 48 includes a stop plate 49 which, when the cover is in a raised position, engages the hanger 37 to hold the cover in a raised position.

The container 11 is provided with an end plate 50 adjacent one end and at the other end is provided with a circular flange 51. A closure member 52 is removably secured to the flange 51 as by bolts 53 and is secured to the rear apron 38 by bolts as at 54.

A thermometer 55 is mounted in one of the aprons 38 and extends downward into the interior of the tank member 36.

One of the aprons 38 and one end of the tank member 36 are secured as by welding to an end plate 56 which is parallel to and spaced from the closure 52. The other apron 38 and the other end of the member 36 are secured as by welding to an end plate 57 which is parallel to and spaced from the plate 50. A flue tube 58 extends between the plates 56 and 57.

Secured to the closure 52 is a semi-circular sheet 61 of asbestos or other insulating material. Mounted in the end plate 56 and extending through the sheet 61 and the plate 52 I provide a pair of removable valved spigots 59 and 60. A baffle plate 62 is secured to the plate 52 above the opening of the flue tube 58 and serves to clamp the sheet 61 in place.

A burner shield 63 in which the burner 22 is positioned is removably secured to the end plate 50 and includes a reduced portion 64 which extends through the plate 50 and into the tube 58.

The front apron 38 is removably secured to the plate 50 as at 65. When it is desired to remove the tank 36 from the container 11 the spigots 59 and 60 are removed, bolts 53 and 54 are removed and the cover 52 is removed. The fastening 65 is removed and the tank 36 and its associated hangers 37 are slid rearwardly along the shelf portions 34.

In operation the tank is filled with tar or whatever substance that is to be melted and the burner 22 lighted. The flame and products of combustion pass through the portion 64 through the flue tube 58 and impinge on the asbestos plate 61. The heated gases then are directed sidewardly and downwardly by the baffle 62 and flow back through the crescent shaped region between the tank 36 and the container 11 to the space between the plate 50 and the plate 57. From there the gases discharge through an aperture 66 and are directed upwardly and downwardly by a deflector 67.

From the foregoing description it will be apparent that I have provided a novel heating kettle which is safe and efficient in use and which is simple and economical to manufacture and maintain.

Having thus described my invention I claim:

1. In a melting kettle, an elongated U-shaped frame having parallel sides, a container removably secured between said sides, said container being of general circular cross section, said container having an open top and having outwardly directed shelves along the top, a receptacle having hanger portions thereon, said receptacle hanger portions slidably engaging the shelf portions of the container so that the receptacle may be slidably removed from the container, said receptacle being generally circular in cross-section and of a diameter less than that of the container, said container and receptacle having their upper portions closely adjacent to each other so that a crescent shaped space is formed between the receptacle and container, an apron at each end of the receptacle, the inner ends of said aprons being directed upwardly to form flanges defining an opening, a cover for said opening and disposed on said flanges, said receptacle and said container having ends, said ends being spaced apart, a flue extending through said receptacle, a burner arranged at one end of the receptacle, a shield about said burner, said shield extending through the adjacent end of the container and being disposed in the end of the flue, the end of the container remote from said burner being readily removably mounted to allow the receptacle to be removed.

2. In a melting kettle, an elongated U-shaped frame having parallel sides, a container removably secured between said sides, said container being of general circular cross section, said container having an open top and having outwardly directed shelf portions on the sides of the top, a receptacle having outwardly directed hanger portions thereon, said receptacle hanger portions slidably engaging the shelf portions of the container so that the receptacle may be slidably removed from the container, said receptacle being generally circular in cross section and of a diameter less than that of the container, said container and receptacle having their upper portions closely adjacent to each other so that a crescent shaped space is formed between the receptacle and container, said receptacle having a top closure with an opening therein, a cover for said opening, said cover being hinged to one of said hangers, said cover having a downwardly directed flange at the outer edge thereof, a lever mounted on said cover, said lever including an operating portion accessible from one side of the kettle, said receptacle and said container having ends, said ends being spaced apart, a flue extending through said receptacle, a burner arranged at one end of the receptacle, a shield about said burner, said shield extending through the adjacent end of the container and being disposed in the end of the flue, the distance between the end wall of the receptacle and container at the end remote from the burner being greater than the distance from the receptacle and burner at the end adjacent said burner, the end of the container remote from said burner being removably mounted to allow the receptacle to be removed.

3. In a melting kettle, an elongated U-shaped frame having parallel sides, a container removably secured between said sides, said container being of general circular cross section, said container having an open top and having outwardly directed angular shelf portions along the entire length of the sides of the top, a receptacle having angularly extending outwardly directed hanger portions thereon, said receptacle hanger portions slidably engaging the shelf portions of the container so that the receptacle may be slidably removed from the container, said receptacle being generally circular in cross section and of a diameter less than that of the container, said container and receptacle having their upper portions closely adjacent to each other so that a crescent shaped space is formed between the receptacle and container, an apron extending between hanger portions of the receptacle at each end thereof the inner ends of said apron being bent upwardly to form flanges defining an opening, a cover for said opening and disposed on said flanges, said cover being hinged to one of said hangers, said cover having a downwardly directed flange thereon at the outer edge thereof, a second flange secured to the cover within the first mentioned flange, said receptacle opening having a U-shaped member extending thereabove, said second flange being disposed within said U-shaped member, a lever mounted on said cover, said lever including an operating portion accessible from one side of the kettle, said receptacle and said container having ends, said ends being spaced apart, a flue extending through said receptacle, a burner arranged at one end of the receptacle, a shield about said burner, said shield extending through the adjacent end of the container and being disposed in the end of the flue, the distance between the end wall of the receptacle and container at the end remote from the burner being greater than the distance from the receptacle and burner at the end adjacent said burner, the end of the container remote from said burner being readily removably mounted to allow the receptacle to be removed.

4. In a melting kettle, a frame, a container secured to said frame, said container being of general circular cross section and having an open top with outwardly directed shelves along the top, a receptacle having hanger portions thereon, said receptacle hanger portions slidably engaging the shelf portions of the container so that the receptacle may be slidably removed from the container, said receptacle being generally circular in cross section and of a diameter less than that of the container, said container and receptacle having their upper portions closely adjacent to each other so that a longitudinally extending, crescent shaped space is formed between the receptacle and the container, an apron at each end of the receptacle, the inner ends of said apron having upwardly directed flanges defining an opening, a cover for said opening, said receptacle and said container having ends, said ends being spaced apart, a flue extending through said receptacle, a burner arranged at one end of the receptacle, the end of the container remote from said burner being readily removable to allow the receptacle to be removed.

JAMES N. WILLIAMS.